US010514752B2

(12) United States Patent
Clement et al.

(10) Patent No.: US 10,514,752 B2
(45) Date of Patent: Dec. 24, 2019

(54) METHODS AND APPARATUS TO DETERMINE OBJECTS TO PRESENT IN VIRTUAL REALITY ENVIRONMENTS

(71) Applicant: Google Inc., Mountain View, CA (US)

(72) Inventors: Manuel Christian Clement, Felton, CA (US); Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/644,300

(22) Filed: Jul. 7, 2017

(65) Prior Publication Data
US 2018/0011531 A1 Jan. 11, 2018

Related U.S. Application Data

(60) Provisional application No. 62/359,432, filed on Jul. 7, 2016.

(51) Int. Cl.
*G06F 3/01* (2006.01)
*G06F 3/16* (2006.01)

(52) U.S. Cl.
CPC .............. *G06F 3/011* (2013.01); *G06F 3/012* (2013.01); *G06F 3/013* (2013.01); *G06F 3/16* (2013.01)

(58) Field of Classification Search
CPC .......... G06F 3/011; G06F 3/012; G06F 3/013; G06F 3/016
See application file for complete search history.

(56) References Cited

U.S. PATENT DOCUMENTS

| 2013/0194164 A1* | 8/2013 | Sugden ............... G02B 27/017 345/8 |
| 2013/0331127 A1* | 12/2013 | Sabatelli ............. H04W 4/80 455/456.3 |
| 2014/0098137 A1* | 4/2014 | Fein .................. G06T 11/00 345/633 |
| 2014/0125584 A1* | 5/2014 | Xun ................... G06F 3/013 345/156 |
| 2014/0320389 A1* | 10/2014 | Scavezze ............. G06F 3/011 345/156 |
| 2017/0061692 A1* | 3/2017 | Giraldi ............... G06T 19/006 |
| 2017/0109936 A1* | 4/2017 | Powderly ............ G06F 3/012 |
| 2018/0046851 A1* | 2/2018 | Kienzle .............. G06K 9/00248 |

OTHER PUBLICATIONS

International Search Report and Written Opinion for PCT Patent Application No. PCT/US2017/041165, dated Aug. 30, 2017, 11 pages.

(Continued)

*Primary Examiner* — Ariel A Balaoing
(74) *Attorney, Agent, or Firm* — Brake Hughes Bellermann LLP

(57) ABSTRACT

In at least one general aspect, a method can include detecting an interaction with a first object in a virtual reality (VR) environment, producing first contextual information based on user interaction with the first object, determining a second object to display in the VR environment based on the first contextual information, and presenting the second object in the VR environment. The interaction of the user may include at least one of a movement, a speech, or a physiological trait of the user.

20 Claims, 7 Drawing Sheets

(56) References Cited

OTHER PUBLICATIONS

Written Opinion of the International Preliminary Examining Authority for International Application No. PCT/US2017/041165, dated Aug. 16, 2018, 8 pages.
International Preliminary Report on Patentability for International Application No. PCT/US2017/041165, dated Jan. 17, 2019, 10 pages.

* cited by examiner

METHODS AND APPARATUS TO DETERMINE OBJECTS TO PRESENT IN VIRTUAL REALITY ENVIRONMENTS

RELATED APPLICATION

This application claims the priority benefit of U.S. Provisional Patent Application No. 62/359,432, filed on Jul. 7, 2016, and entitled "METHOD AND APPARATUS TO DETERMINE OBJECTS TO PRESENT IN VIRTUAL REALITY ENVIRONMENTS," the entirety of which is incorporated herein by reference.

FIELD OF THE DISCLOSURE

This disclosure relates generally to virtual reality (VR) environments, and, more particularly, to methods and apparatus to determine objects to present in VR environments.

BACKGROUND

VR environments provide users with applications and components which they can use to interact with virtual objects.

SUMMARY

In one general aspect, a method can include detecting an interaction with a first object in a virtual reality (VR) environment, producing first contextual information based on user interaction with the first object, determining a second object to display in the VR environment based on the first contextual information, and presenting the second object in the VR environment. The interaction may be at least one of a movement, a speech, or a physiological trait of the user.

In another general aspect, a method can include detecting an interaction with a first object in a virtual reality (VR) environment, obtaining first contextual information associated with the interaction with the first object based on user interaction with the first object determining a gaze direction in accordance with the interaction of the user with the first object, determining a second object to display in the VR environment based on the determined gaze direction, and presenting the second object in the VR environment.

In another general aspect, a system may include a computing device configured to generate a virtual environment. The computing device may include a memory storing executable instructions, and a processor configured to execute the instructions, to cause the computing device to detecting an interaction with a first object in a virtual reality (VR) environment, producing first contextual information based on user interaction with the first object, determining a second object to display in the VR environment based on the first contextual information, and presenting the second object in the VR environment. The interaction may be at least one of a movement, a speech, or a physiological trait of the user.

The details of one or more implementations are set forth in the accompanying drawings and the description below. Other features will be apparent from the description and drawings, and from the claims.

DETAILED DESCRIPTION

Figure 1:
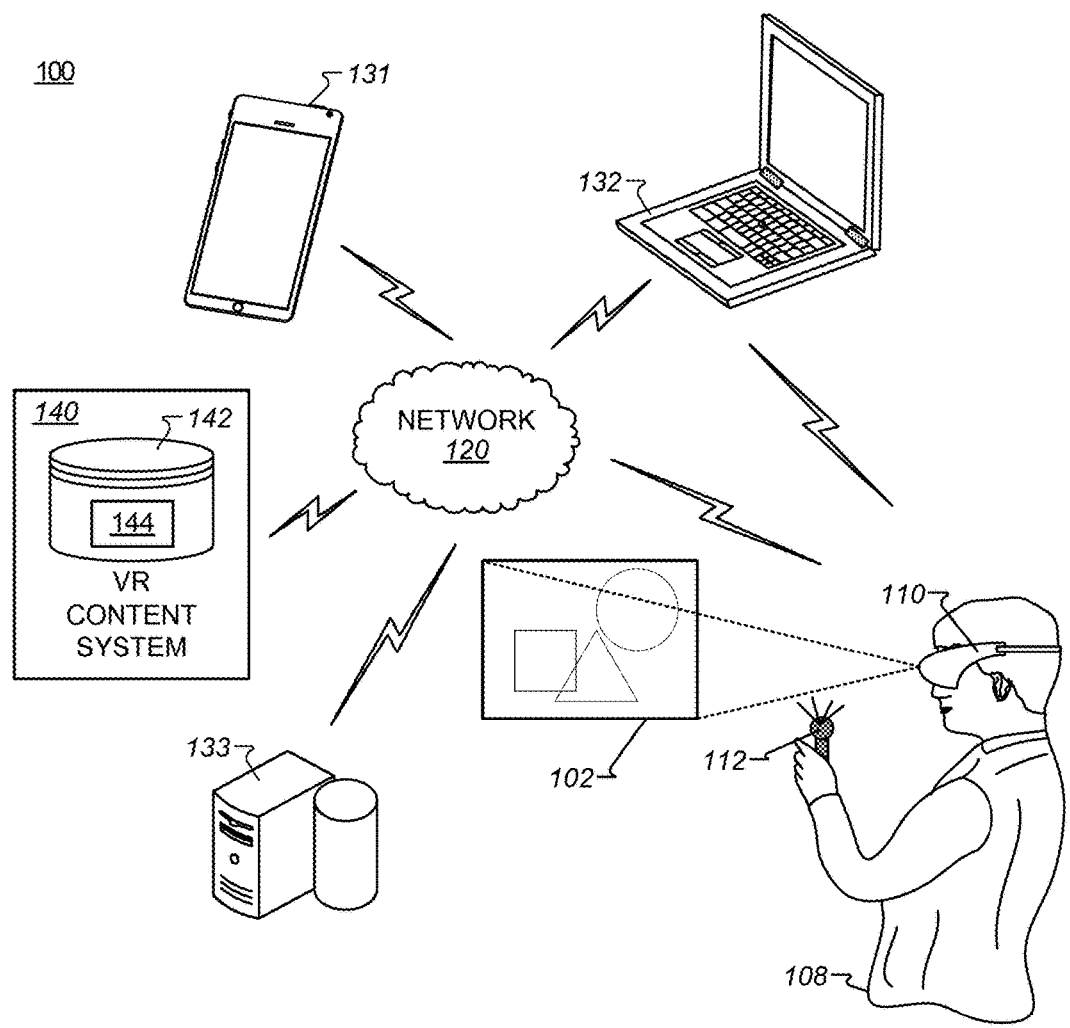
FIG. 1 is a diagram of an example VR system that may be used to determine objects to present in VR environments in accordance with an example embodiment.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 illustrates a diagram of an example virtual reality (VR) system 100 for creating and interacting with a three-dimensional (3D) VR environment 102 in accordance with the teachings of this disclosure is shown. In general, the system 100 may provide the VR environment 102, and VR content that enable a person (e.g., a user, a wearer, etc.) to access, view, use and/or interact with the VR environment 102. The VR system 100 can provide the user with options for accessing the content, applications, virtual objects, real objects, and VR controls. The example VR system 100 of FIG. 1 may include a user 108 wearing a head-mounted display (HMD) 110, and having a handheld controller 112. The example VR environment 102 shown in FIG. 1 is a representation of the images being displayed for the user inside their HMD 110.

The example VR system 100 may include any number of computing and/or electronic devices that can exchange data over a network 120. The devices may represent clients or servers, and can communicate via the network 120 or any other additional and/or alternative network(s). Example client devices include, but are not limited to, the HMD 110, the handheld controller 112, a mobile device 131 (e.g., a smartphone, a personal digital assistant, a portable media player, etc.), a laptop or netbook 132, a desktop computer 133, an electronic tablet (not shown), a camera (not shown), a gaming device (not shown), and any other electronic or computing devices that can communicate using the network 120 or other network(s) with other computing or electronic devices or systems, or that may be used to access VR content or operate within a VR environment. The devices 110, 112, and 131-133 may represent client or server devices. The devices 110, 112, and 131-133 can execute a client operating system, and one or more client applications that can access, render, provide, or display VR content on a display device included in or in conjunction with each respective device 110, 112 and 131-133.

Figure 2:
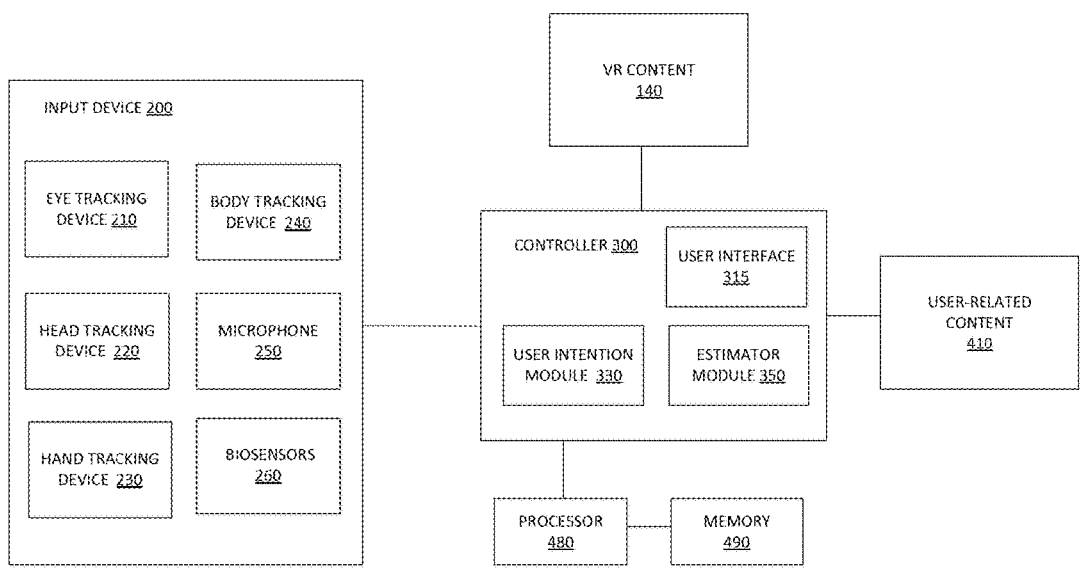
FIG. 2 is a schematic block diagram illustrating an example VR display presenting objects determined in accordance with an example embodiment.

Referring to FIG. 2, the VR system 100 may include an input device 200 to obtain information relating to movement of the user, speech of the user and/or physiological traits of the user. The input device 200 can be configured to be located on any or all of the devices 110, 112, and 131-133. For example, in an illustrated embodiment as described in this disclosure, the input device 200 may be located on the HMD 110 to obtain information from the user in order to perform certain functions executed by a controller 300. The input device 200 may be an eye tracking device 210, a head tracking device 220, a hand tracking device 230, a body tracking device 240, a microphone 250, and/or a biosensor 260.

In some implementations, the VR system 100 may track a position and orientation of the input device 200, and update the user's view within the virtual environment 102. Orientation can be represented by 3 degrees of freedom (3DOF) including forward/backward (X coordinate), right/left (Y coordinate), and up/down (Z coordinate); and 6 degrees of freedom (6DOF) including forward/backward (X coordinate), right/left (Y coordinate), up/down (Z coordinate), pitch, yaw and roll.

In some implementations, the input device 200 (e.g., eye tracking device 210) may measure the user's eye movement and/or position in relationship to an object. For example, the eye tracking device 210 may transmit information to the controller 300 regarding the eye position of the user. The eye tracking data could be used, for instance, to determine a direction in which the user may be gazing at an object. The controller 300 may determine a target object(s) among the displayed images based on information from the eye-tracking device 210, and respond accordingly. For example, the controller 300 may use a pupil position recognition technique using devices (e.g., an infrared (IR) light source and/or an infrared (IR) camera) to determine the user's eye location and direction. The controller 300 may further control a user interface 315 and a display panel on the HMD 110 to display images to the user that may include contextual information based on the user's eye location and direction.

In order to determine the actual position of a user's pupil and to determine a corresponding gaze axis, the user's pupil may be illuminated by an infrared light source or multiple infrared light sources. An infrared camera may image the pupil and other parts of the user's eye. The infrared light source(s) could be located in the HMD 110 optical path, or could alternatively be located off-axis. The infrared camera could also be located in the HMD 110 optical path or off-axis. Possible eye tracking modalities that could be used include, for example, dark pupil imaging. The controller 300 may further implement an image processing algorithm to find the edges or extents of the imaged pupil. The image processing algorithms may include pattern recognition, edge detection, thresholding, contrast detection, and/or differential edge detection. After image processing, the controller 300 may determine a gaze axis, which may be defined as an axis extending from a viewing location and through a gaze point located within the user's field of view.

As shown in FIG. 2, the VR system 100 may further include a user-related content 410 configured to store data that may relate to past user data. For example, the user-related content 410 may include a set of calibrated user eye pupil positions and a collection of past eye pupil positions. Thus, the user-related content 410 may function as a database of information related to gaze direction. Such information may be used by the controller 300 to anticipate where the user will look and determine what images are to be displayed to the user. Calibrated user eye pupil positions may include, for instance, information regarding the extent or range of the user's eye pupil movement (right/left and upwards/downwards) as well as user eye pupil positions that may relate to various reference axes. While the exemplary embodiment describes the user-related content 410 related to user's pupil position, the user-related content 410 may store other data relating to the user, for example, but not limited to, user's pattern of movement (e.g., walking), speed of movement, pattern in gestures, voice recognition, etc.

In some implementations, the user-related content 410 may also include (e.g., store) data relating to certain object(s) viewed previously by the user. For example, the user-related content 410 may store data associated with a certain object that was previously viewed and/or handled by the user in the VR environment 102, which may then be retrieved at a later time.

In some implementations, the input device 200 (e.g., head tracking device 220 and/or a body tracking device 240) may measure the user's movement in relationship to an object. Example movement information include three dimensions of freedom (3DoF) and six degrees of freedom (6DoF) tracking data. Movement information may be determined using any number and/or type(s) of emitters, sensors and/or cameras. The movement data may be representative of actual (e.g., physical, real, non-virtual, etc.) movement of a user, an HMD, a handheld controller, a limb, a head, a hand, a foot, a torso, etc. In some implementations, the actual movement data may be captured in 3D.

In some implementations, the user's movement may be associated to touching (e.g., grabbing or picking up) an object, moving toward an object, pointing at an object, etc. in the VR environment 102 The movement data could also be used, for instance, to determine a direction in which the user may be walking towards at an object. In some implementations, the movement data may be used when the user walks away from the object, indicating that the user may not be interested in the object. The controller 300 may determine a target object(s) among the displayed images based on information from the input device 200, and respond accordingly. For example, the controller 300 may use a positioning recognition technique using devices (e.g., a global positioning system (GPS), a gyroscope, and/or accelerometer) to determine the user's location and position of the HMD 110. The controller 300 may further control the user interface 315 and the display panel on the HMD 110 to display images to the user that may include context-specific information based on the location and position of the HMD 110.

In some implementations, the movement data could also be used, for instance, to determine a speed in which the user may be walking towards at an object. For example, the user may walk towards the object at approximately 0.89 m/s to 1.34 m/s (e.g., average walking speed) to obtain information regarding the user's movement and respond accordingly. In another example, if the user moves towards the object at a faster speed than the average walking speed, the controller 300 may also obtain information regarding the user's movement and respond accordingly.

In some implementations, the movement data could also be used, for instance, to determine a direction (e.g., vector) in which the user walks towards the object. For example, the user may walk towards the object in the same direction may obtain information regarding the user's movement and respond accordingly In some implementations, the movement data could also be used, for instance, for duration (e.g., time of period) in which the user walks towards the object. For example, the user walking towards the object at more than 3 seconds may obtain information regarding the user's movement and respond accordingly.

In some implementations, the movement data (e.g., direction, speed and/or duration) may be used together to obtain the information regarding the user's movement and respond accordingly. For example, the user may move towards (same direction) the object at a speed greater than 1.34 m/s to obtain information about the object.

In some implementations, the input device 200 (e.g., a hand tracking device 230) may determine (e.g., measure) a user's hand movement of the handheld controller 112 in relationship to an object. For example, the user's hand movement may be associated with moving the handheld controller 112 toward an object. In another example, the movement of the handheld controller 112 may be associated with the movement of the user's hand moving away from the object indicating that the user may not be interested in the object. The controller 300 may obtain information regarding the movement of the controller 112 and respond accordingly. For example, the controller 300 may use a positioning recognition technique using devices (e.g., a global positioning system (GPS), a gyroscope, and/or accelerometer) located on the handheld controller 112 to determine the position and orientation of the handheld controller 112. The controller 300 may further control the user interface and a display panel on the HMD 110 to display images to the user that may include context-specific information based on the HMD 110 location and orientation.

In some implementations, the information regarding the movement of the controller 112 may be used together with the movement data (e.g., direction, speed and/or duration) to obtain the information regarding the user's movement. For example, the user may move the controller 112 towards the object while simultaneously moving towards the object to obtain additional information about the object.

In some implementations, the input device 200 (e.g., microphone) may measure the user's voice and/or command in relationship to an object. For example, the user's voice and/or command may be associated to receiving explicit request for information (e.g., "What is that?"). The controller 300 may obtain information regarding the user's voice request and respond accordingly. For example, the controller 300 may use a content speech analysis using a device (e.g., microphone) to determine the user's request for information. In some implementations, the controller 300 may measure the user's voice inflection (e.g., higher pitch, lower pitch) and/or tone in relation to the object. For example, the user may say "Wow, what is that?" with a different voice inflection. When a user's voice range increases to about 2 octaves, for example, the controller 300 may obtain information regarding the user's voice and respond accordingly. The controller 300 may then control the user interface 315 and the display panel on the HMD 110 to display images to the user that may include context-specific information based on the user's request for information.

In some implementations, the information regarding the user's voice request may be used together with the movement data (e.g., direction, speed and/or duration) to obtain the information regarding the user's movement. For example, the user may verbally request additional information while moving toward the object.

In some implementations, the input device 200 (e.g., biosensors 260) may measure the user's physiological traits in relationship to an object. For example, the user's physiological traits may be associated with heart rate, breathing, blood pressure, perspiration, etc. in the VR environment 102 The controller 300 may obtain information regarding the user's physiological traits and respond accordingly. For example, the controller 300 may determine body measurements using devices (e.g., transducers) to determine the physiological traits of the user in relationship to an object. The controller 300 may further control the user interface 315 and the display panel on the HMD 110 to display images to the user that may include context-specific information based on the physiological traits of the user.

In some implementations, the information regarding the user's physiological traits may be used together with the movement data (e.g., direction, speed and/or duration) to obtain the information regarding the user's movement. For example, the user may have a higher heart rate while moving towards the object to obtain information about the object.

Figure 3:
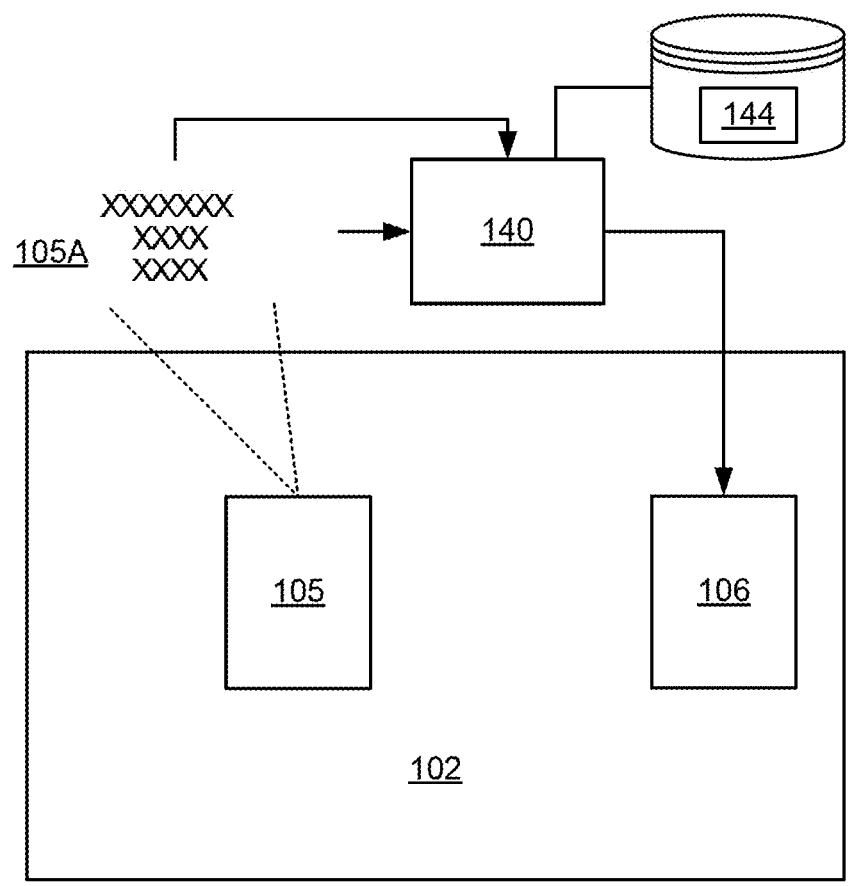
FIG. 3 is a diagram illustrating an example VR display presenting objects determined in accordance with an example embodiment.

Referring to FIG. 3, the example VR environment 102 may include an object 105, in which the user may interact therewith. In general, current, recent, or past interactions with one or more objects in the VR environment 102 are used herein to provide a context for determining a current or future object to present. Example determinations include adjusting the results of a search object (e.g., providing a "what is that?" query) to depend at least in part on the context, determining a characteristic of an object at least in part on the context, selecting an object from a database of objects (e.g., the VR database 142 of FIG. 1) at least in part on the context, etc. Regarding the example search object, if a user was reading a page in a book on Oak trees and then soon thereafter asked "what is that?" in reference to a grove of trees they are looking at, an Oak tree can be highlighted and information regarding Oak trees can be presented.

As shown in FIG. 3, the VR environment 102 may include at least two objects 105 and 106. In accordance with this disclosure, a determination (e.g., a selection) of the object 106 to present is based at least in part on a person's interaction with the object 105. For example, if the object 105 is a fish tank and the user interacts with the fish tank (as represented by contextual information 105A representing the fish tank and the interaction), then the object 106 may be determined by a VR content system (e.g., the VR content system 140 of FIG. 1) to be a book on fish. By basing the determination of objects to present based on objects interacted therewith (e.g., based on contextual information), the VR environment 102 can be dynamic and responsive to a user's specific interactions with the VR environment 102. In this way, every user will have their own unique interactions with the VR environment 102 without needing to configure fixed rules that are used to operate the VR environment 102 for all users.

In some implementations, the contextual information for a VR object may be pre-programmed for the VR object. For example, the person who creates or defines the VR object defines the contextual information for the VR object and associated interactions. Additionally and/or alternatively, a person building or defining a VR environment defines contextual information for the VR objects and/or VR environment. The contextual information may depend on the type(s) interaction(s) that occur. The contextual information may depend on the length of interactions, a sequence of interactions, etc. In accordance to example embodiments described herein, the term "contextual information" may be any information associated with the object.

Referring back to FIG. 2, the controller 300, via user intention module 330, may obtain contextual information and render an object 106 to be displayed in the VR environment 102 without user's specific request based on user interaction with object 105. That is, the user intention module 330 may predict the user's intention with object 105 based on the user's interaction (e.g. performed action) with the object 105. One example interaction that can produce (e.g., trigger) contextual information may include movement of the user in relationship to the object 105. For example, using the book on Oak trees example, when the user moves toward the book (i.e., object 105), the controller 300 may trigger contextual information 105A and may render a furniture made from an Oak tree (e.g., object 106) to be displayed in the VR environment 102. Similarly, the contextual information 105A may be triggered when the user runs toward the object versus slowly walking toward the object. Employing the user intention module 330 provides a system to search less and/or more relevant information, buffer the information, and to be displayed, with minimal actions (e.g., searching) to the user. Additionally, the user intention module 330 would permit the user to operate (e.g., clicking) less devices (e.g., controller 112, HMD 110 and devices 131-133) in order to produce greater efficiency (e.g., sifting through all of the data available about the object(s)) and/or reduce latency for devices.

In another example, when the user points at the book on Oak tress (e.g., object 105), the controller 300 will trigger contextual information 105A and render a furniture made from an Oak tree (e.g., object 106) to be displayed in the VR environment 102. In another example, when the user grabs or picks-up the book on Oak tress (e.g., object 105), the controller 300 will trigger contextual information 105A and render a furniture made from an Oak tree (e.g., object 106) to be displayed in the VR environment 102.

In some implementations, the controller 300 may trigger contextual information and may render an object 106 to be displayed based on the user's gaze direction related to the object 105. For example, while the user is observing an object (e.g., painting) in the VR environment 102, the user observes another object (e.g., Oak tree) and gazes at the targeted object. The controller 300 may then trigger contextual information and may render an object 106 (e.g., furniture made from Oak tree) to be displayed in the VR environment 102 without user's specific request. In some implementations, the triggered contextual information may be time based (e.g., how long the user gazed at the object) and/or focused based (e.g., how intense the user gazed at the object). For example, if the user gazes at the object for more than 3 seconds, the contextual information may be triggered.

In some implementations, the controller 300 may trigger contextual information and may render an object 106 to be displayed based on the user's voice and/or command related to the object 105. For example, while in a virtual meeting, the user observes a cake on a conference table and speaks ("I'm hungry"), the controller 300 may then trigger contextual information and may render an object 106 (e.g., nearest bakery shop) to be displayed in the VR environment 102 without user's specific request. In that manner, user interaction becomes more efficient, since the user does not have to further interact with the VR environment to obtain the additional contextual information through rendered object 106. In some implementations, the triggered contextual information may be an explicit request for information ("Where's the nearest bakery?"). In some implementations, the controller 300 using speech analysis may determine the content of the speech and determine whether or not to trigger the contextual information. For example, during a virtual meeting, the user observes (e.g., glances) a cake but continues the conversation with other user(s) in the meeting, in this case, the controller 300 will not trigger the contextual information as the controller 300 recognizes that the user's interaction with the object (e.g., cake) was not relevant to execute the contextual information due to the user's continued conversation.

In some implementations, the controller 300 may trigger contextual information and may render an object 106 to be displayed based on the user's physiological traits related to the object 105. For example, while in a sporting event, the user gets excited during the game and his/her heart rate increases (e.g., goes up), the controller 300 may then trigger contextual information and may render an object 106 (e.g., schedule of next 10 games) to be displayed in the VR environment 102 without user's specific request. For example, an average adult may have a resting heart rate of approximately 60-100 beats per minute, and if the user's heart rate rises above the resting stage due to extraneous activity, the controller 300 may trigger the contextual information. In some implementations, the triggered contextual information may be an explicit request for information ("Can I have the schedule for the next 10 games?").

In some implementations, the controller 300 may also trigger contextual information and render an object 106 when the user's heart rate decreases and/or approaches a resting heart rate. For example, the controller 300 may recognize that the user wants to relax, and may then trigger a contextual information associated with leisure activities and/or relaxation (e.g., vacation packages, spa, mental health, etc.).

Figure 4:
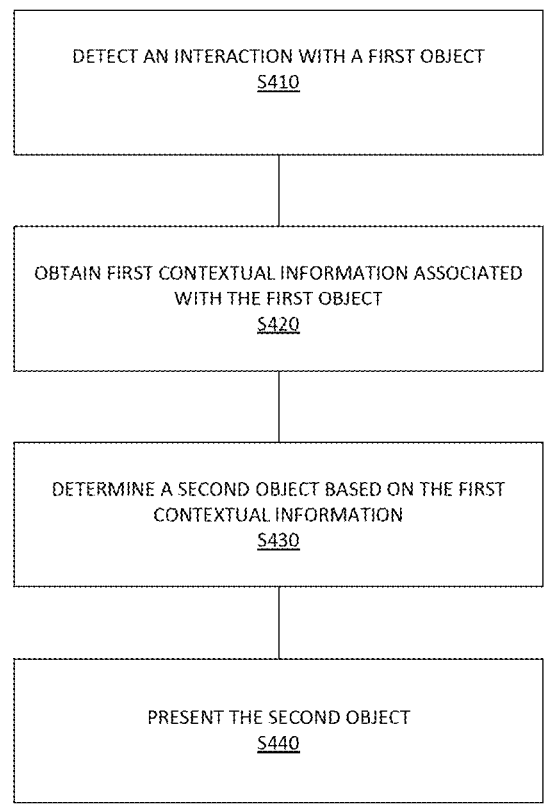
FIG. 4 is a flowchart representing an example method that may be used to determine objects to present in VR environments.

FIG. 4 is a flowchart representing an example method that may be used to determine objects to present in the VR environment 102.

In S410, the controller 300 may be configured to detect an interaction with a first object. In some implementations, user may interact with the object based on movement, speech and/or physiological trait of the user in relationship to the object. For example, the user may interact with the first object by moving towards the object, grabbing the object, pointing at the object, requesting a specific question, and/or looking towards at the object.

In S420, once the interaction of the first object is detected, the controller 300 obtains first contextual information. The first contextual information may be any information that is associated with the first object. In S430, a second object may be rendered based on the first contextual information. The second object may be an object that is related to the first object. In S440, the second object is presented to the user. At this time, the user may engage (e.g., interact) with the second object if he/she desires.

Figure 5:
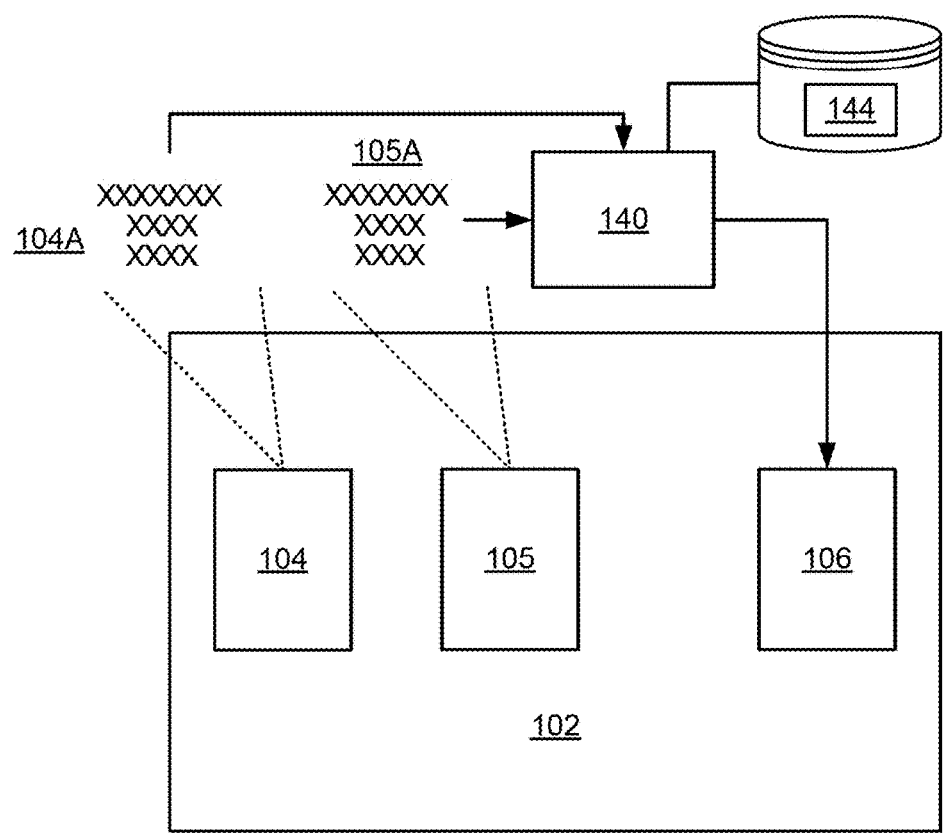
FIG. 5 is a diagram illustrating an example VR display presenting objects determined in accordance with another example embodiment.

Referring to FIG. 5, the example VR environment 102 may include at least three objects 104, 105, and 106. In accordance with this disclosure, a determination (e.g., a selection) of the object 106 to present is based at least in part on a user's interaction with object 104 or object 105. The current, recent, or past interactions with one or more objects (e.g., objects 104 or 105) in the VR environment 102 may be used herein to provide a context for determining a current or future object to present. In some implementations, if the object 104 is interacted with, the determination for the object 106 can be based on the contextual information 105A as well as contextual information 104A for the object 104.

In some implementations, contextual information may be time weighted such that newer contextual information is weighted more heavily (e.g., given more relevance or consideration) than older contextual information. For example, if the object 104 is interacted with prior to interaction with the object 105, the contextual information 105A can be given more weight or importance in the determination of the object 106. In other words, the most recent interaction can be heavily weighted (e.g., high importance or relevance) while an older interaction is given little importance or relevance (e.g., lightly weighted). For example, using an example of a painting and a clock next to each other on a wall, if the user recently had a conversation regarding art and gazes in the general direction of the painting and clock, the contextual information of the painting would have more weight since it was the most recent interaction. On the other hand, if the user recently interacted with the clock to schedule a meeting, the contextual information of the clock will have more weight since it has more relevance (importance) to the user's intentions.

The weightings may be determined, for example, according to a linear, a non-linear decrease, an exponential decrease, etc. Contextual information may, for instance, timeout such that it is no longer used to determine an object after a period of time. For example, objects interacted with in the last 24 hours may be weighted more heavily versus objects interacted with in the last 7 days. In some implementations, the weighting of contextual information, additionally or alternatively, depends on the VR object or interaction. In some implementations, looking at an object may be weighted more heavily than other interactions, interacting with one object may be weighted more heavily than interacting another object, multiple interactions with an object may be weighted very heavily, etc. For example, a user focusing (e.g., more than 3 seconds) at an object may be weighted more heavily than the user gazing at the object.

In some implementations, the VR system 100 may include multiple users (i.e., two or more users) in a same VR environment 102, and may detect a respective interaction with an object. Each respective user may interact with an object(s) and obtain respective contextual information. The users may share the contextual information or each user may obtain the contextual information in an independent basis. For example, during a virtual meeting, a first user is talking to a second user across a conference table, which has an object on the table. When one or both users interact (e.g., gaze) at the object, both users may obtain the contextual information based on one or both user's interaction with the object.

In some implementations, using a joint intention analysis, the VR system 100 may determine whether or not to obtain contextual information associated with an object for multiple users. In other words, the joint intention analysis will determine whether to trigger the contextual information based on the interaction of both users with the object. For example, using the same example of a virtual meeting, a first user is talking to a second user across a conference table, which has an object on the table. One or both users may interact (e.g., gaze) at the object, however, in this situation, the VR system 100 will not trigger the contextual information associated with the object because the system would take into account the content of the conversion which is not related to the object on the table. In this case, the system employed speech analysis to ascertain the content of the speech and determined not to trigger the contextual information since the object was not related to the conversion.

Referring back to FIG. 2, the controller 300 may further include an estimator module 350. The user intention module 330 uses the estimator module 360 to estimate a probability of triggering the contextual information based on the user's interaction with an object. In some implementations, the estimator module 360 may include more than one action and estimate the user's intentions. For example, the estimator module 360 may have several estimations (e.g. a 75% probability rate for intention A, a 15% probability rate for intention B, and 10% probability rate for intention C) based on the user's current interaction with the object and/or previous interaction with the object. Since intention A has the highest probability rate (e.g., 75%), the estimator module 360 will commence with intention A. Using an example of a painting and a clock next to each other on a wall, if the user recently had a conversation regarding art and gazes in the general direction of the painting and clock, the estimator module 360 may estimate that the painting would have more weight since it has the highest probability.

Figure 6:
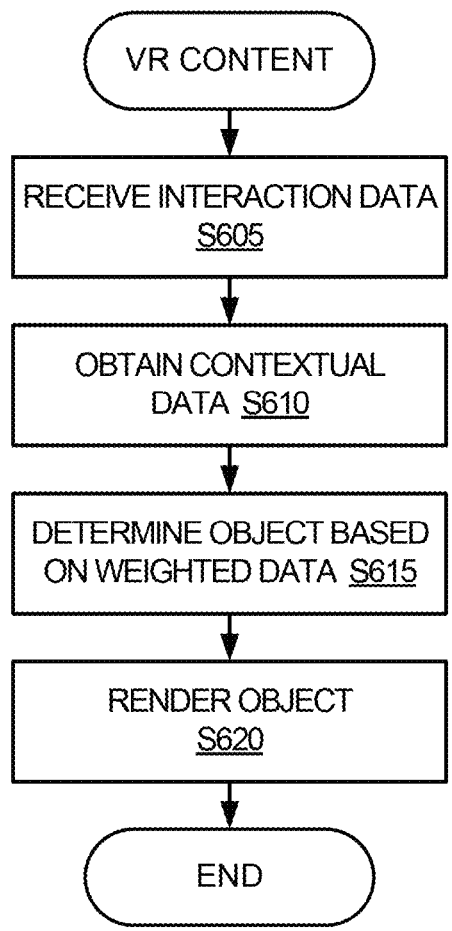
FIG. 6 is a flowchart representing another example method that may be used to determine objects to present in VR environments.

FIG. 6 is a flowchart of an example method that may, for example, be implemented as machine-readable instructions carried out by one or more processors to implement the example object determining disclosed herein. The example method of FIG. 6 may include receiving data indicative of an interaction with an object, i.e., contextual information (in S605). In some implementations, the user may interact with the object based on movement, speech and/or physiological trait of the user in relationship to the object. For example, the user may interact with the first object by moving towards the object, grabbing the object, pointing at the object, requesting a specific question, and/or looking towards and/or at the object. In S610, contextual information for the object is obtained. The obtained contextual information may be any information that is associated with the object. Then in S615, the object is determined using both sets of contextual information which may be weighted data. In some implementations, contextual information may be time weighted such that newer contextual information may be weighted more heavily (e.g., given more relevance or consideration) than older contextual information. In S620, the object may be rendered and displayed in an HMD 110.

In some implementations, not all objects in a VR environment need to have associated contextual information. In some implementations, objects can be real objects and virtual objects.

Referring back to FIG. 2, the HMD 110 may represent a VR HMD, glasses, an eyepiece, or any other wearable device capable of displaying VR content. In operation, the HMD 110 can execute a VR application 144 that can playback received, rendered and/or processed images for a user. In some instances, the VR application 144 can be hosted by one or more of the devices 131-133.

In some implementations, one or more content servers (e.g., VR content system 140) and one or more computer-readable storage devices can communicate with the computing devices 110 and 131-133 using the network 120 to provide VR content to the devices 110 and 131-133. In some implementations, information contained in the one or more content servers (e.g., VR content system 140) may be cloud-based.

In some implementations, the mobile device 131 can execute the VR application 144 and provide the content for the VR environment 102. In some implementations, the laptop computing device 132 can execute the VR application 144 and can provide content from one or more content servers (e.g., VR content server 140). The one or more content servers and one or more computer-readable storage devices can communicate with the mobile device 131 and/or laptop computing device 132 using the network 120 to provide content for display in HMD 110.

In the event that HMD 110 is wirelessly coupled to controller 112 and devices 131-133, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi or wireless local area network (WLAN), Bluetooth, Transmission Control Protocol/Internet Protocol (TCP/IP), a satellite data network, a cellular data network, a Wi-Fi hotspot, the Internet, and a wireless wide area network (WWAN).

In the event that the HMD 110 is electrically coupled to controller 112 and devices 131-133, a cable with an appropriate connector on either end for plugging into the controller 112 and the devices 131-133 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD 110 and devices 131-133. For example, the cable can include a USB connector on both ends. The USB connectors can be the same USB type connector or the USB connectors can each be a different type of USB connector. Either end of a cable used to couple devices 131-133 to HMD 110 may be fixedly connected to devices 131-133 and/or HMD 110.

As shown in FIG. 1, the VR system 100 includes any number of VR content systems 140 storing content and/or VR software modules (e.g., in the form of VR applications 144) that can generate, modify, and/or execute VR objects and scenes. In some examples, devices 110, 112 and 131-133 and the VR content system 140 include one or more processors and one or more memory devices, which can execute a client operating system and one or more client applications. In some implementations, the HMD 110, the controller 112, the other devices 131-133 or the VR content system 140 may be implemented by example computing devices (e.g., P00 and/or P50 of FIG. 8).

The VR applications 144 can be configured to execute on any or all of devices 110, 112 and 131-133. The HMD 110 can be connected to devices 131-133 to access VR content on VR content system 140, for example. Device 131-133 can be connected (wired or wirelessly) to HMD 110, which can provide VR content for display. A user's VR system can be HMD 110 alone, or a combination of device 131-133 and HMD 110.

In some implementations, the VR system 100 may include a motion sensing device and, under some circumstance, the user may be able to control a graphical representation in the VR environment 102 (and/or the user in the VR environment) in conjunction with the motion sensing device or the controller 112.

In some implementations, the VR system 100 may include a haptic based system or device. Such haptic based systems may provide the user with physical stimuli, such as mechanical feedback, corresponding at least in part to interactions between the graphical representation of the user, the VR environment 102, and/or objects depicted in the VR environment 102.

For example, the user may, within the VR environment 102, interact with an object (e.g., a virtual object). The object can be, or can include, any of a wide variety of objects at least some of which represent or correspond to real world objects. Such an interaction may involve a graphical representation of the user (or a portion thereof) interacting with a graphical representation of the object within the VR environment 102.

Figure 7:
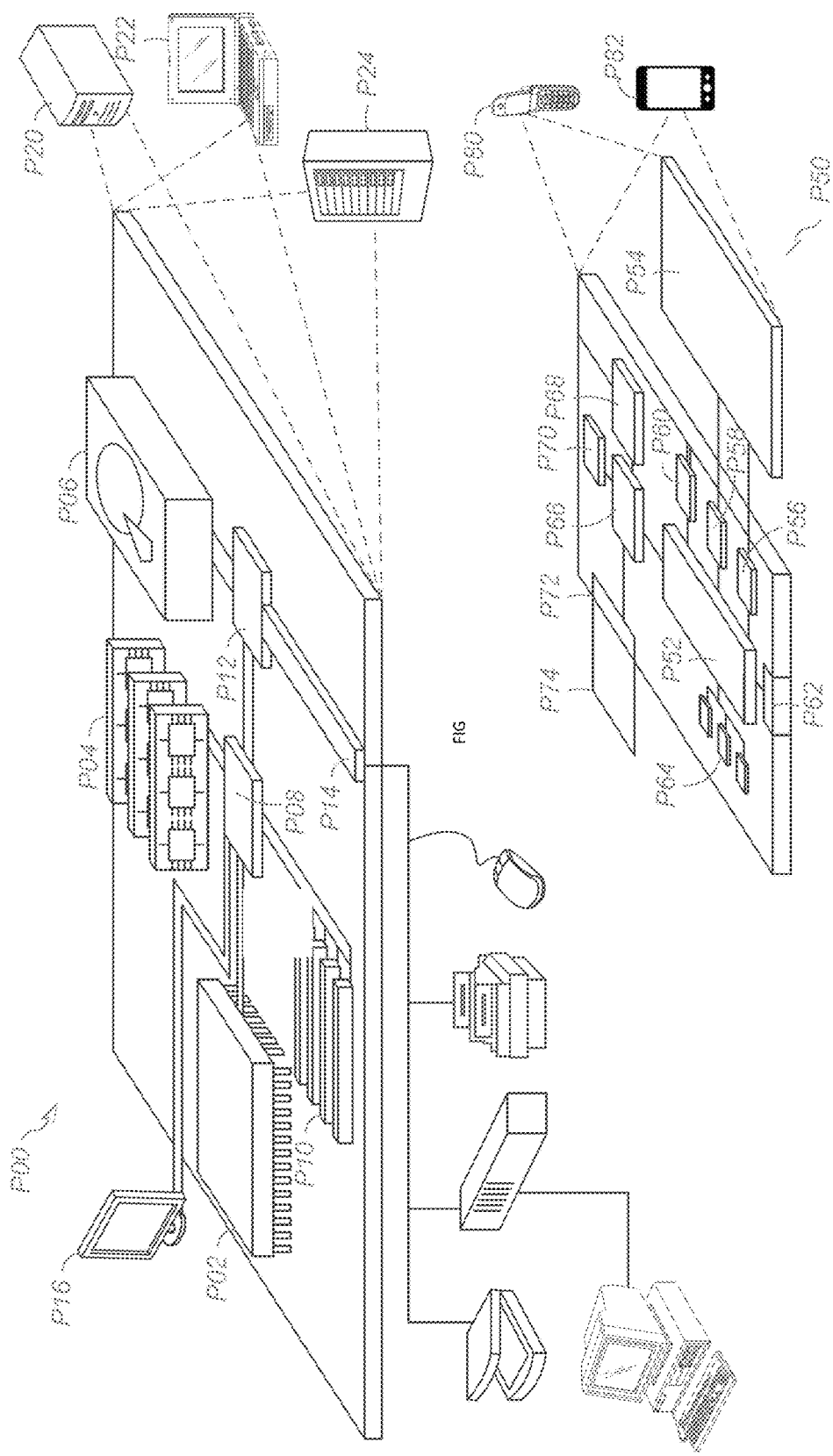
FIG. 7 is a schematic block diagram of an example computer device and an example mobile computer device, which may be used to implement the examples disclosed herein.

FIG. 7 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms P00 and P50 discussed below in connection with FIG. 4. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. carried out by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms P00 and P50 discussed below in connection with FIG. 4. Machine-readable instructions include, for example, instructions that cause a processor, a computer and/or a machine having a processor to perform one or more particular processes or methods.

The example methods disclosed herein may, for example, be implemented as instructions, program code, machine-readable instructions carried out by a processor, a computer and/or other machine having a processor. A processor, a controller and/or any other suitable processing device may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing device P50 can include sensors that interface with a virtual reality headset (HMD 110). For example, one or more sensors included on a computing device P50 or other computing device depicted in FIG. 7, can provide input to HMD 110 or in general, provide input to a VR environment. The sensors can include, but are not limited to, a touchscreen, accelerometers, gyroscopes, pressure sensors, biometric sensors, temperature sensors, humidity sensors, and ambient light sensors. The computing device P50 can use the sensors to determine an absolute position and/or a detected rotation of the computing device in the VR environment that can then be used as input to the VR environment. For example, the computing device P50 may be incorporated into the VR environment as a virtual object, such as a controller, a laser pointer, a keyboard, a weapon, etc. Positioning of the computing device/virtual object by the user when incorporated into the VR environment can allow the user to position the computing device to view the virtual object in certain manners in the VR environment. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device P50 can be used as input to the VR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device P50 when the computing device is incorporated into the VR environment can cause a particular action to occur in the VR environment.

In some implementations, a touchscreen of the computing device P50 can be rendered as a touchpad in VR environment. A user can interact with the touchscreen of the computing device P50. The interactions are rendered, in HMD 110 for example, as movements on the rendered touchpad in the VR environment. The rendered movements can control objects in the VR environment.

In some implementations, one or more output devices included on the computing device P50 can provide output and/or feedback to a user of the HMD 110 in the VR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device P50 may appear as another object in a computer-generated, 3D environment. Interactions by the user with the computing device P50 (e.g., rotating, shaking, touching a touchscreen, swiping a finger across a touch screen) can be interpreted as interactions with the object in the VR environment. In the example of the laser pointer in a VR environment, the computing device P50 appears as a virtual laser pointer in the computer-generated, 3D environment. As the user manipulates the computing device P50, the user in the VR environment sees movement of the laser pointer. The user receives feedback from interactions with the computing device P50 in the VR environment on the computing device P50 or on the HMD 110.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR environment to control objects in the VR environment.

Computing device P00 is intended to represent various forms of digital computers, such as laptops, desktops, workstations, personal digital assistants, servers, blade servers, mainframes, and other appropriate computers. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Further implementations s are summarized in the following examples:

Example 1

A method comprising: detecting an interaction with a first object in a virtual reality (VR) environment; producing first contextual information based on user interaction with the first object, the interaction includes at least one of a movement, a speech, or physiological trait of the user; determining a second object to display in the VR environment based on the first contextual information; and presenting the second object in the VR environment.

Example 2

The method of claim 1, wherein the interaction is at least two of a movement, a speech, and physiological trait of the user.

Example 3

The method of example 1 or 2, wherein the movement of the user is obtained via at least one of an eye-tracking device, a head-tracking device, a hand-tracking device, or a body-tracking device.

Example 4

The method of example 1 to 3, wherein the speech of the user is obtained via a microphone.

Example 5

The method of example 1-4, wherein the physiological traits of the user are obtained via a biosensor.

Example 6

The method of one of examples 2 to 6, wherein the first contextual information is triggered when the user walks toward the first object in the VR environment.

Example 7

The method of one of examples 1 to 6, wherein the first contextual information is triggered when the user focuses on the first object in the VR environment.

Example 8

The method of one of examples 1 to 7, wherein the triggering of the first contextual information includes estimating a result to determine whether to display the second object.

Example 9

The method of one of examples 1 to 8, further comprising: detecting an interaction with a third object in the VR environment; obtaining second contextual information associated with the interaction with the third object; determining the second object to display in the VR environment based on the first contextual information and the second contextual information.

Example 10

The method of one of examples 1 to 9, wherein the first contextual information and the second contextual information are weighted when determining the second object based on which of the interaction with the first object or the interaction with the third object occurs first.

Example 11

The method of one of examples 1 to 10, wherein determining the second object includes selecting the second object from a database of objects.

Example 12

The method one of examples 1 to 2, wherein the first object is a real object.

Example 13

The method one of examples 1 to 12, wherein the first object is a virtual object.

Example 14

A method comprising: detecting an interaction with a first object in a virtual reality (VR) environment; obtaining first contextual information associated with the interaction with the first object based on user interaction with the first object; determining a gaze direction in accordance with the user's interaction with the first object; determining a second object to display in the VR environment based on the determined gaze direction; and presenting the second object in the VR environment.

Example 15

The method of example 14 wherein the determining the gaze direction includes determining a first intensity level and a second intensity level, wherein: the first intensity level corresponds to the user focusing on the first object, and the second intensity level corresponds to the user glancing at the first object.

Example 16

The method of example 15, wherein when the user is at the first intensity level, the second object is presented to the user.

Example 17

The method of example 15, wherein when the user is at the second intensity level, the second object is not presented to the user.

Example 18

A system comprising: a computing device configured to generate a virtual environment, the computing device including: a memory storing executable instructions; and a processor configured to execute the instructions, to cause the computing device to: detecting an interaction with a first object in a virtual reality (VR) environment; obtaining first contextual information associated with the interaction with the first object based on user interaction with the first object; determining a second object to display in the VR environment based on the first contextual information; and presenting the second object in the VR environment.

Example 19

A non-transitory machine-readable media stores machine-readable instructions that, when executed, cause a machine to at least perform the method of example 1.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   detecting an interaction with a first object in a virtual reality (VR) environment;
   producing first contextual information based on user interaction with the first object within the VR environment, the interaction includes a physical movement being represented by movement data, the movement data being used to determine a direction in which the user's entire body moves toward the first object, the first contextual information being produced based on the determined direction;
   determining a second object to display in the VR environment based on the first contextual information; and
   presenting the second object in the VR environment.

2. The method of claim 1, wherein the movement of the user is obtained via at least one of an eye-tracking device, a head-tracking device, a hand-tracking device, or a body-tracking device.

3. The method of claim 1, wherein the interaction further includes speech, the speech of the user is obtained via a microphone.

4. The method of claim 1, wherein the interaction further includes physiological trait of the user, the physiological trait of the user is obtained via a biosensor.

5. The method of claim 1, wherein the first contextual information is produced when the user focuses on the first object in the VR environment.

6. The method of claim 1, wherein producing the first contextual information includes estimating a result to determine whether to display the second object.

7. The method of claim 1, further comprising:
detecting an interaction with a third object in the VR environment;
obtaining second contextual information associated with the interaction with the third object; and
determining the second object to display in the VR environment based on the first contextual information and the second contextual information.

8. The method of claim 7, wherein the first contextual information and the second contextual information are weighted when determining the second object based on which of the interaction with the first object or the interaction with the third object occurs first.

9. The method of claim 1, wherein determining the second object includes selecting the second object from a database of objects.

10. The method of claim 1, wherein the first object is a real object.

11. The method of claim 1, wherein the first object is a virtual object.

12. The method of claim 1, further comprising:
determining a gaze direction in accordance with the interaction of the user with the first object; and
determining the second object to display in the VR environment based on the determined gaze direction.

13. The method of claim 12, wherein the determining the gaze direction includes determining a first intensity level and a second intensity level, wherein:
the first intensity level corresponds to the user focusing on the first object, and
the second intensity level corresponds to the user glancing at the first object.

14. The method of claim 13, wherein when the user is at the first intensity level, the second object is presented to the user.

15. The method of claim 13, wherein when the user is at the second intensity level, the second object is not presented to the user.

16. A system, comprising:
a computing device configured to generate a virtual environment, the computing device including:
a memory storing executable instructions; and
a processor configured to execute the instructions, to cause the computing device to:
detecting an interaction with a first object in a virtual reality (VR) environment;
obtaining first contextual information based on user interaction with the first object, the interaction includes a physical movement being represented by movement data, the movement data being used to determine a direction and duration in which the user moves toward the first object, the first contextual information being produced based on the determined direction toward the first object and based on a speed the user moves towards the first object;
determining a second object to display in the VR environment based on the first contextual information; and
presenting the second object in the VR environment.

17. A non-transitory machine-readable media stores machine-readable instructions that, when executed, cause a machine to at least perform the method of claim 1.

18. The method of claim 1, further comprising determining a duration in which the user moves toward the first object.

19. The method of claim 1, wherein the first contextual information is produced based on whether the user moves towards the first object at a faster speed than an average walking speed.

20. A method comprising:
detecting an interaction with a first object in a virtual reality (VR) environment;
producing first contextual information based on user interaction with the first object within the VR environment, the interaction includes a physical movement being represented by movement data, the movement data being used to determine a direction and duration in which the user walks toward the first object, the first contextual information being produced based on the determined direction;
determining a second object to display in the VR environment based on the first contextual information; and
presenting the second object in the VR environment.

* * * * *